TAPE LOOP CONTROL SYSTEM

Filed Nov. 16, 1964 2 Sheets-Sheet 1

INVENTOR.
ROBERT A. PENDLETON
BY Fred Jacob
ATT'Y.

INVENTOR.
ROBERT A. PENDLETON
BY Fred Jacob
ATT'Y.

3,307,795
Patented Mar. 7, 1967

3,307,795

TAPE LOOP CONTROL SYSTEM

Robert A. Pendleton, Dedham, Mass., assignor to Honeywell Inc., a corporation of Delaware Filed Nov. 16, 1964, Ser. No. 411,202
15 Claims. (Cl. 242—55.12)

The present invention relates in general to pneumatically operated transports for selectively positioning a continuous web, and in particular to a web reel control system for use with said transports.

Present day, high-speed data processing equipment requires input and output equipment which is capable of dispensing or accepting data rapidly. Magnetic tape transports are frequently employed for this purpose, the tape being selectively moved past an operating station at which data is either read in or read out by means of a magnetic head. An example of prior art tape transports of this type is disclosed in Patent No. 2,866,637 by Robert A. Pendleton, issued December 30, 1958 and assigned to the assignee of the present invention.

In FIGURE 1 of the present application, the aforesaid tape transport is illustrated in modified form. A pair of counter-rotating capstans is disposed on opposite sides of the operating station, each capstan containing a plurality of grooves on its periphery which communicate with an inlet conduit. When vacuum pressure is selectively applied through the aforesaid conduit to one of the capstans, the tape riding above the capstan grooves is drawn into contact with the capstan and has imparted thereto the velocity of the latter. Stationary pneumatic braking means are provided opposite the operating station, which similarly include grooves communicating with the inlet conduit. When it is desired to arrest the tape at a predetermined point, the applied vacuum pressure is switched from the capstan to the braking means to draw the tape into contact with the latter.

A pair of tape reels which define the terminal points of the tape path become either take-up or dispensing reels, depending on the direction in which the tape is moved. Since the inertia of these reels, particularly when they carry magnetic tape, is far greater than that of the tape section opposite the operating station, the reels are generally incapable of responding at the speeds at which tape movement in one direction from a rest position, or successively in opposite directions, may be called for. To this end, a buffer in the form of a loop chamber is positioned in the tape path between each tape reel and the corresponding capstan which is open at one end to receive a loop of the magnetic tape. A vacuum is applied at the closed end of the loop chamber in order to maintain tension in the tape. Sensing points in the form of holes are provided along the length of the loop chamber, each adapted to sense the prevailing pressure. The distribution of atmospheric and vacuum pressures within each chamber is determined by the position of the loop.

An independent servo system must be provided to keep the tape loop in a zone which brakets a reference line in the loop chamber, sometimes referred to as the crossover point. A relatively simple and inexpensive way of implementing this requirement is by the use of a non-linear servo system controlled from the aforesaid sensing points. Whenever the tape loop rises too high in the chamber, a drive motor energizes the appropriate tape reel. This causes the reel to rotate in a direction adapted to dispense tape, so as to lower the tape loop and return it to the aforesaid zone. Similarly, when the tape loop falls below the aforesaid zone, the reel motor is energized to rotate the reel in the opposite direction. In the latter case, the reel takes up tape until the tape loop returns to the aforesaid zone.

As previously explained, the inertia of the tape reel, particularly if it carries an appreciable amount of tape, is relatively large. In order to arrest the rotation of the reel, a braking force must be applied in time to prevent overshoot by the tape loop of the desired zone. In pneumatic tape transports of the kind disclosed in the aforesaid Pendleton Patent No. 2,866,637, vacuum pressure is employed to move a friction disc brake selectively into contact with the tape reel and apply a mechanical braking force thereto. A limitation of a disc brake for the present purpose is its bilateral operation. This restricts the duration of its application within the zone defined by the drive reel motor energization points, since the brake can effectively prevent motor rotation. The application and the termination of the braking force consequently occurs relatively abruptly and tends to throw into disarray the uniform manner in which tape is wound on the reel.

Pneumatic disc brakes also require a relatively high vacuum in order to operate them, higher than in available in the loop chamber. Thus, under certain conditions, special equipment may be necessary in order to supply the requisite tape reel braking force in a tape transport. In tape transports which operate at very high speeds, disc brakes or the equivalent cannot be dispensed with. Where lower tape speeds are encountered, however, a more moderate braking force is sufficient which can operate directly from loop chamber vacuum pressures.

Accordingly, it is the primary object of the present invention to provide a web transport which is not subject to the foregoing disadvantages.

It is another object of the present invention to provide a web transport wherein the acceleration and deceleration of the tape reels occur gradually.

It is a further object of the present invention to provide a web transport wherein the zones in which mechanical braking occurs are greatly extended over those in use in heretofore available equipment.

It is an additional object of the present invention to provide a web transport wherein the application of a mechanical braking force to a tape reel and the reverse energization of its drive motor may occur simultaneously.

It is still another object of the present invention to provide a pneumatically operated web transport having vacuum loop chambers for tensioning the web, wherein the pressure in the loop chambers is employed to operate a mechanical web reel braking means.

These and other novel features of the invention together with further objects and advantages thereof will become apparent from the following detailed specification with reference to the accompanying drawings in which.

Figures 1, 2:
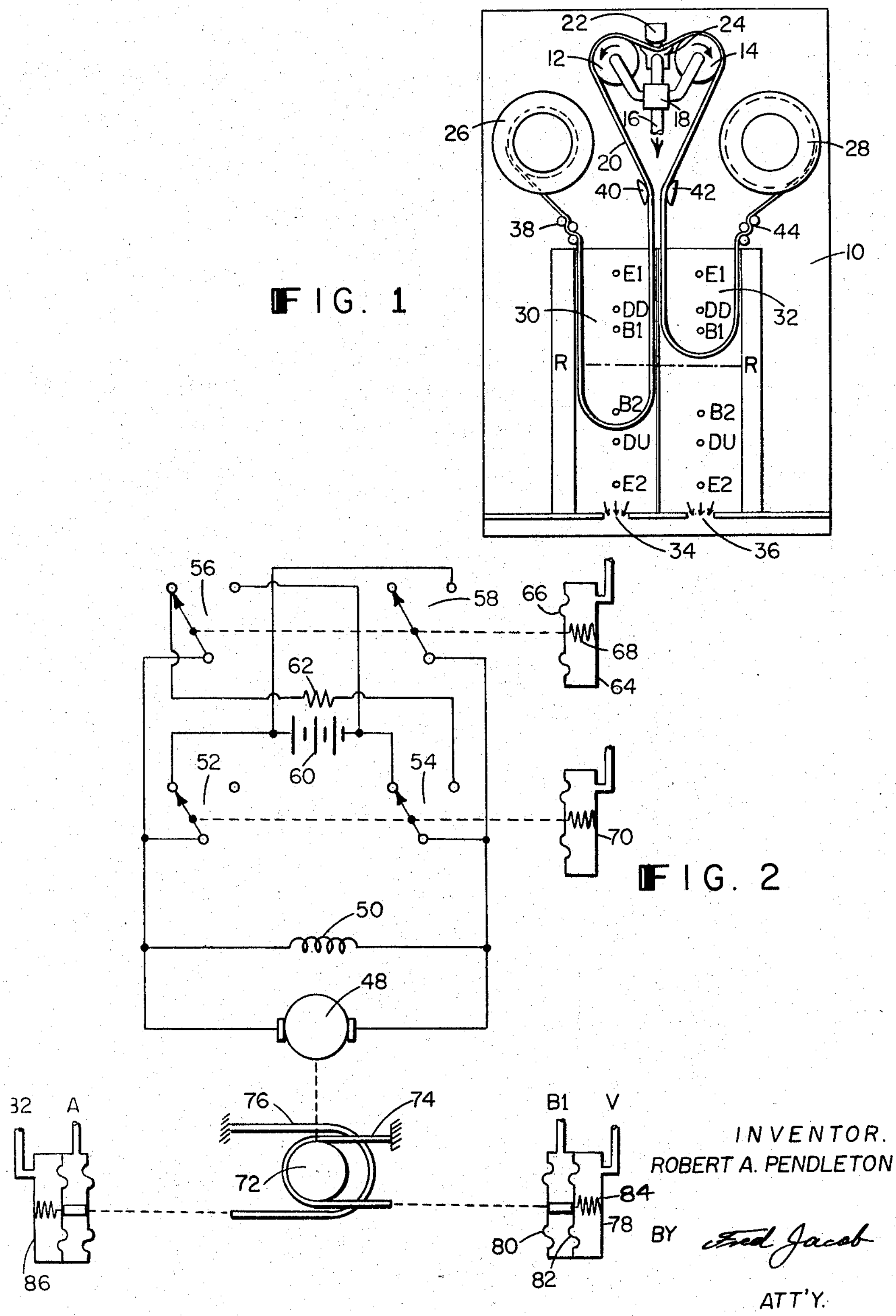
FIGURE 1 illustrates the essential components of the pneumatically operated web transport disclosed in the aforesaid Pendleton Patent No. 2,866,637.
FIGURE 2 illustrates a preferred embodiment of a web reel servo control system in accordance with the present invention.

The invention will be described and explained with reference to a magnetic tape transport, although it will be understood that it is similarly applicable to any continuous web transport. FIGURE 1 illustrates a transport 10 having a pair of counter-rotating capstans 12 and 14, each adapted upon the application of vacuum pressure by way of the inlet conduit 16 and the pneumatic switch 18, to drive the tape 20 past the operating station which is positioned between the capstans.

The operating station includes a magnetic head 22, as well as a vacuum brake 24 positioned opposite the magnetic head and adapted to arrest the moving tape. The pneumatic switch 18 selectively applies a vacuum to one or the other of the counter-rotating capstans, or to the brake 24. A pair of tape reels 26 and 28 respectively, are positioned at the terminal points of the tape path, the latter further including a pair of loop chambers 30 and 32 respectively, each positioned between tape reel and the corresponding capstan and adapted to accept a loop of said tape at its open extreme. The opposite extreme of each loop chamber is closed, with the exception of openings 34 and 36 respectively, for applying vacuum pressure to each chamber.

The tape thus moves, by way of suitable guides 38, 40, 42 and 44 respectively, to form a loop in each loop chamber which is in contact with the side walls thereof. The depth of each loop chamber is such as to permit free movement of tape loop within the chamber without permitting the equalization of the atmospheric pressure at the open end of the chamber and the vacuum pressure applied at the opposite end.

A reference line R—R is established in each loop chamber and is preferably positioned centrally thereof. Each loop chamber further contains sensing points in the form of small openings distributed along the length of the chamber. Mechanical braking of the tape reel is initiated when the sensing points B1 and B2, which bracket the reference line, are passed by the tape loop. A pair of sensing points DD and DU bracket the pair B1 and B2 to define the limits of a first zone. A pair of sensing points E1 and E2 are positioned at the extremes of each loop chamber to trigger an emergency stop when the tape loop position exceeds the permissible bounds within the chamber.

Mechanical braking is effective in each one of a pair of zones which overlap in the area B1 to B2. Thus, one of the overlapping braking zones may extend from the sensing point B1 to terminate at some desired point between the sensing point DU and the closed end of the loop chamber. The latter point may, for example, be the sensing point E2, or it may actually constitute a point at the vacuum pressure inlet of the closed extreme of the loop chamber. The other braking zone extends from the sensing point B2 and may terminate at a desired point between DD and the open end of the loop chamber, for example, at the sensing point E1.

FIGURE 2 illustrates a preferred embodiment of a servo system for controlling the position of a single tape loop within its loop chamber. As previously explained, each tape reel is driven by a drive motor coupled thereto, such as the drive motor 48 in FIGURE 2. A shunt field 50 is coupled across the armature of the drive motor 48. Opposite terminals of the aforesaid armature are further connected to the switch arms of a first pair of ganged switches 52, 54, as well as to the switch arms of a second pair of ganged switches 56, 58. One set of corresponding contacts of the switches 52 and 54 is connected across a D.C. source 60. Similarly, one pair of corresponding contacts of the switches 56 and 58 is connected in opposite manner to the aforesaid D.C. source 60. The other contact of each of the switches 52 and 58 is left unconnected, while a resistor 62, which has a low resistance value, is connected across the other contacts of the switches 56 and 54.

The switch arms of the switches 56 and 58 are ganged to move jointly when operated by an actuator 64. The latter comprises a diaphragm 66 which is normally urged to the left in the drawing by a compression spring 68. A conduit couples the actuator 64 to the sensing point DD in the corresponding loop chamber. Similarly, the switch arms of the switches 52 and 54 are ganged together to move jointly upon actuation by an actuator 70. The latter, which is substantially identical to the actuator 68, is coupled to the sensing point DU by a conduit.

The drive motor 48 is mechanically coupled to its corresponding tape reel (not shown), as well as to a brake drum 72. A pair of brake bands 74 and 76 respectively, encircle the brake drum 72 in opposite directions. In a preferred embodiment of the invention, each brake band is adapted to contact the brake drum along an arc of approximately 270 degrees. One end of each brake band is fixed as shown in FIGURE 2, the free ends being mechanically coupled to a pair of substantially identical actuators 78 and 86 respectively. The actuator 78 comprises a pair of diaphragms 80 and 82 which are mechanically connected to move jointly. The latter pair of diaphragms define a first chamber with the case of the actuator, which is coupled by a conduit to the sensing point B1 of the corresponding loop chamber. The diaphragms 80 and 82 are urged to the left in the drawing by a compression spring 84 which is normally adapted to keep the brake band 74 out of contact with the brake drum 72. The compression spring 84 is positioned in a second chamber defined by the diaphragm 82 and the case of the actuator 78, which is conduit-coupled to vacuum pressure V. As previously explained, this may be any point between the sensing point DU and the closed end of the corresponding loop chamber.

The actuator 86 similarly comprises a pair of diaphragms mechanically connected to move jointly and urged to the right in the drawing by a compression spring which serves to maintain the brake band 76 normally out of contact with the brake drum 72. The actuator 86 comprises a first chamber defined by the aforesaid pair of diaphragms and the actuator case, which is conduit-coupled to a point that may be taken anywhere between the sensing point DD and atmosphere at the open end of the loop chamber. A second chamber of the actuator 80, defined by one diaphragm and the actuator case, contains the compression spring and is conduit-coupled to the sensing point B2.

Figure 3:
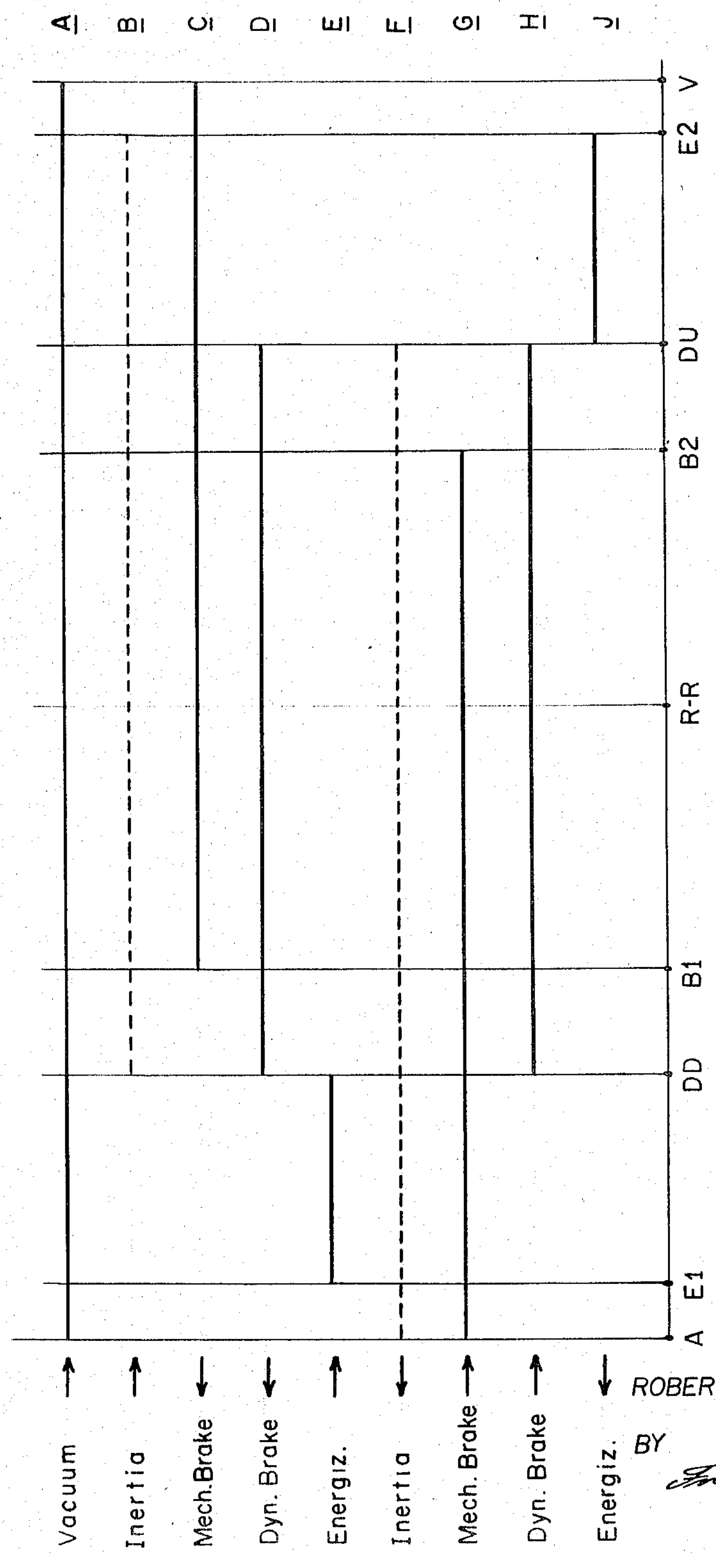
FIGURE 3 diagrammatically illustrates the operation of the present invention.

The operation of the apparatus of FIGURES 1 and 2 will be explained with reference to the diagram of FIGURE 3, which illustrates the various factors which operate to affect the position of a single tape loop in the loop chamber. The abscissa in FIGURE 3 is representative of the long dimension of the chamber, the open and closed extremes being represented at the left and right respectively of the diagram.

Let it be assumed that the tape loop is at rest at the reference line R—R in the loop chamber 30. Under these conditions, atmospheric pressure will obtain at all sensing points above the reference line, i.e. at the points E1, DD, and B1, while vacuum pressure will prevail at all points below the reference line, i.e. at the points B2, DU and E2. As previously explained, vacuum pressure is applied at the closed end of the loop chamber in order to maintain tension in the tape at all times. This is illustrated in FIGURE 3 at A, the associated arrow indicating that a constant force is exerted on the tape loop in the downward direction, throughtout the length of the loop chamber.

The application of atmospheric pressure to the actuator 64, which is coupled to the point DD, leaves the compression spring 68 free to push the switch arms of the ganged pair of switches 56 and 58 to the left hand contacts in the circuit of FIGURE 2. Conversely, the application of a vacuum to the actuator 70 which is coupled to the sensing point DU, is sufficient to overcome the force of the compression spring in the later actuator to move its diaphragm to the right in the drawing. The switch arms of the ganged pair of switches 52 and 54 will then be at the right hand contacts in FIGURE 2.

The contacts engaged by the switch arms of the switches 52 and 58 are seen to be disconnected. The switches 54 and 56, on the other hand, serve to switch the resistor 62 in parallel with the shunt winding 50. Since resistor 62 has a low resistance value, an effective short circuit is established across the armature of the motor 48. This connection serves to apply a dynamic braking force to the motor when it rotates in either direction, but not when it is stationary.

With atmospheric pressure prevailing at the sensing point B1, a pressure differential is established in the actuator 78 which is referenced to vacuum pressure. This differential pressure is sufficient to overcome the force of the compression spring 84 and to move the brake band 74 into contact with the brake drum 72. In this position, the brake band is unilaterally operative to oppose drum motion in the counter-clockwise direction which serves to apply a pull to the fixed end of the bond. Drum motion in the clockwise direction may occur substantially unopposed by the contacting brake band 74.

The application of vacuum pressure to the actuator 86 by way of the sensing point B2 will result in a pressure differential relative to the referenced atmospheric pressure, sufficient to overcome the force of the compression spring in that actuator. The resultant motion of the actuator diaphragms to the left in the drawing urges the brake band 76 into contact with the brake drum 72. It will be noted that the latter brake band encircles the brake drum in a direction opposite to that of the brake band 74. In this position, the brake band 76 opposes clockwise drum motion which causes the brake band to pull against its fixed end. Counter-clockwise motion of the drum will be substantially unopposed by the brake band 76.

Let it be assumed that tape motion to the right relative to the magnetic head 22 is called for in FIGURE 1, such motion being effected by applying vacuum pressure to the capstan 14 which rotates in a clockwise direction. Confining the present discussion to the loop chamber 30, this action will cause the tape loop in the latter chamber to shorten, whence it rises upward from the reference line R—R. When the sensing point B1 is passed, vacuum pressure is applied to both inlet conduits of the actuator 78. The compression spring 84 then takes over and urges the brake band 74 out of contact with the brake drum 72. This frees the brake drum, as well as the drive motor 48 and the tape reel 26 which are coupled thereto, for counter-clockwise rotation. When the tape loop rises above the sensing point DD in the loop chamber 30, vacuum pressure is applied to the actuator 64 which causes the switch arms of the ganged switch pair 56 and 58 to move to the right in FIGURE 2. The switch arms of the switches 52 and 54 remain in the right hand position.

The D.C. source 60 is thus connected across the armature of the drive motor 48, by way of the switches 56 and 58. It is here assumed that the resultant energization of of the drive motor, which is diagrammatically illustrated in FIGURE 3 at E, is such as to cause it to turn the connected tape reel 26 in a counter-clockwise direction. It is further assumed that the capstan action is effected in a relatively short time period and that the servo system is capable of a sufficiently rapid response to prevent the tape loop from reaching the emergency points and causing all power to be disconnected.

The counter-clockwise rotation of the tape reel 26 causes tape to be dispensed so as to return the loop below the sensing point DD. This, in turn, causes the switch arms of the switches 56 and 58 to return to their left hand contacts in response to the atmospheric pressure now applied to the actuator 64. The energizing source is thus disconnected from the drive motor 48 and the resistor 62 is again connected across the armature. As indicated by the broken line of FIGURE 3 at B, the rotation of the tape reel due to inertia, once the motor energization is terminated, is indeterminate as to duration and persists until the applied braking force becomes effective to arrest the reel. As shown in FIGURE 3 at D, such reel rotation is opposed by the dynamic braking force which becomes effective when the resistor 62 is connected into the circuit.

The counter-clockwise rotation of the tape reel 26 is not opposed by the brake band 76 which is in contact with the brake drum 72 during this time. As the tape moves in the downward direction in the loop chamber, the sensing point B1 is passed and atmospheric pressure is again applied to the actuator 78. This causes the diaphragms 80 and 82 to move in the right hand direction in FIGURE 2 and to urge the brake band 74 into contact with the brake drum. As illustrated in FIGURE 3 at C, a mechanical braking force is now applied to the brake drum 72 which acts unilaterally to oppose the counter-clockwise rotation of the tape reel 26 between the point B1 and the closed end of the loop chamber.

If the inertia of the rotating tape reel carries the tape loop below the point B2, both inlets of the actuator 86 will be at atmospheric pressure. As a consequence, the compression spring of the latter actuator becomes effective to move the brake band 76 out of contact with the brake drum 72. As illustrated in FIGURE 3 at G, this action removes the mechanical braking force which opposes clockwise reel rotation. When the sensing point DU is reached, the atmospheric pressure applied to the actuator 70 is effective to move the arms of the ganged switches 52 and 54 to the left hand contacts in the drawing. This action terminates the dynamic braking force, as shown in FIGURE 3D, and causes the D.C. source 60 to be connected in the opposite sense across the armature of the drive motor 48. As illustrated in FIGURE 3 at J, the drive motor is reverse-energized and will attempt to turn the tape reel in the clockwise direction. It will be seen that the mechanical braking force which is illustrated in FIGURE 3 at C and which opposes the counter-clockwise rotation of the brake reel, continues to be applied during this interval. As previously noted, its zone of application depends on the point at which the reference vacuum pressure is taken.

Under the assumed operating conditions, the counter-clockwise rotation of tape reel 26 is halted in time to arrest the tape loop before the emergency stop sensing point E2 is reached. The sequence of events which occur as a consequence of the reverse energization of the drive motor 48 will be substantially opposite to that set forth above. It is pointed out that this sequence, which is described below, is identical to the operation which takes place as a consequence of the movement of the tape loop below the sensing point DU due to the operation of the capstan 12.

The energization of the drive motor is terminated by the actuator 70 when the point DU is reached in the upward travel of the tape loop. The resistor 62 is again connected across the armature to provide a dynamic braking force acting in opposition to the inertia of the tape reel. This action is illustrated in FIGURE 3 at F, H, and J. When the sensing point B2 is reached by the tape loop, the actuator 86 causes the brake band 76 to apply a mechanical braking force to the drum 72 which opposes the clockwise rotation of the tape reel 26, as illustrated in FIGURE 3 at G. Should the inertia of the tape reel 26 in a clockwise direction carry it past the point B1, the actuator 78 becomes operative to remove the brake band 74 from contact with the brake drum. If the sensing point DD is again passed by the tape reel, dynamic braking is terminated and the actuator 64 energizes the drive motor 48 to rotate the tape reel in a counter-clockwise direction. The unilateral braking action of the brake band 76, which is illustrated in FIGURE 3 at G, is effective from the sensing point B2 substantially to the open end of the loop chamber 30.

In the present invention, the servo action as a rule returns the tape loop to the zone defined by the sensing points DD and DU in one pass, provided a single tape movement is effected by the capstans. The deceleration of the tape reels, although rapid, is not abrupt and the mechanical braking action is applied simultaneously with the reverse drive motor energization, as indicated in FIGURE 3. This is made possible by the unilateral action of the brake bands each of which, when in contact with the brake drum, opposes the motion of the latter substantially in one direction only.

The tape transport of the present invention is superior to prior art equipment of this kind because of the extension of the effective mechanical braking zones past the drive motor energization points. Both the response of the servo system and the wind-up of the tape on the tape reels are improved as a consequence. Such improved performance is achieved with simpler equipment and without sacrifice of the reliability and economy inherent in the non-linear servo system. The use of special equipment is avoided and a cost reduction is effected by directly using the loop chamber pressures to operate the band brakes.

It will be appreciated that the invention herein disclosed is not limited to magnetic tape transports, but is applicable to any transport where a continuous web must be rapidly moved past an operating station. Depending on the requirements of each application, various adaptations may be desirable or required. For example, the reference line R—R may not be centrally located within the loop chamber, nor will the sensing points necessarily bracket the reference line symmetrically. Such variations may be introduced to offset various forces asymmetrically acting on the tape, for example, vacuum pressure which is applied to the tape loop in a downward direction only. The ganged switches illustrated in FIGURE 2 are exemplary only and could, for example, be replaced by a single switch arm adapted to engage multiple contacts. Similarly, the actuators shown are illustrative only. Single or multiple diaphragm actuators may be employed and the ambient pressure acting on the external surface of one diaphragm may be utilized in place of a spring to maintain the diaphragm normally in one position.

It will be apparent that numerous modifications, substitutions, and equivalents will now occur to those skilled in the art, all of which fall within the scope contemplated by the present invention. Accordingly, the invention is to be construed as limited only by the spirit and scope of the appended claims.

What is claimed is:

1. In a web transport, means for selectively moving said web past an operating station, a reel adapted to hold said web, the path of said web between said reel and said operating station including a loop chamber adapted to accept a loop of said web at one extreme, means for biasing said web loop toward the other extreme of said loop chamber, a servo system for controlling the position of said loop in said chamber including a first pair of loop position sensing means bracketing a crossover point in said chamber, a second pair of loop position sensing means bracketing said first pair and defining a first zone, a pair of mutually overlapping zones each extending from a sensing means of said first pair past a sensing means of the second pair on the other side of said crossover point, means responsive to said second pair of sensing means to drive said reel in a direction adapted to return said loop to said first zone when it is outside the latter, and reel braking means responsive to each of said first pair of sensing means throughout the travel of said loop in a separate one of said overlapping zones for applying a substantially unilateral braking force to said reel adapted to arrest said travel toward the extreme of said loop chamber, said reel braking means being simultaneously operative with said reel driving means outside said first zone.

2. The apparatus of claim 1 wherein said loop chamber is closed at said other end, said biasing means comprising means for applying a vacuum pressure at said closed end so that the position of said loop determines the distribution of atmospheric and vacuum pressure in said chamber, each of said loop position sensing means being responsive to the prevailing chamber pressure at its location.

3. The apparatus of claim 2 wherein said reel drive means comprise a drive motor coupled to said reel, and switch means responsive to each one of said second pair of sensing means to energize said motor for rotation in opposite directions.

4. The apparatus of claim 3 wherein said switch means further include means for connecting said drive motor for dynamic braking when said loop is within said first zone.

5. The apparatus of claim 3 wherein said reel braking means comprise a brake drum coupled to said drive motor, a pair of brake bands encircling said brake drum in opposite directions, each brake band being fixed at one end, and a pair of actuators each connected to the free end of one of said brake bands and normally maintaining the latter out of contact with said brake drum, each of said actuators being connected to be responsive to the differential pressure at the limits of a separate one of said overlapping zones to move its connected brake band into contact with said brake drum.

6. In a web transport, means for selectively moving said web from a supply reel to a take-up reel, the path of said web including at least one web loop, an elongated loop chamber open at one extreme to accept said loop, means for applying a vacuum pressure at the other extreme of said chamber to maintain said web under tension, a first pair of sensing means spaced along said loop chamber to bracket a reference point, a second pair of sensing means bracketing said first pair and defining a first zone in said chamber, a pair of overlapping zones each extending from a sensing means of said first pair past a sensing means of said second pair on the other side of said reference point, drive means coupled to each of said reels, a pair of brake means associated with each drive means and respectively adapted to act substantially unilaterally in opposite directions, means responsive to said second pair of sensing means for actuating said drive means to return said web loop to said first zone when it is outside the latter, and means responsive to said first sensing means throughout the travel of said web loop in said overlapping zones for actuating said brake means to arrest said travel toward the extremes of said loop chambers.

7. In a web transport, means for selectively moving said web from a supply reel to a take-up reel, the path of said web including at least one web loop, an elongated loop chamber open at one extreme to accept said loop, means for applying a vacuum pressure at the other extreme of said chamber to maintain said web under tension, first sensing means disposed in said loop chamber, a pair of mutually spaced sensing means bracketing said first sensing means and defining a first zone, at least a second zone extending from said first sensing means past one of said pair of sensing means toward said other extreme of said loop chamber, drive means coupled to said reels, means responsive to said pair of sensing means for actuating said drive means to return said web loop to said first zone when it is outside the latter, and means responsive to said first sensing means throughout the travel of said web loop in said second zone toward said other extreme for applying a substantially unilateral braking force to said drive means adapted to arrest said travel.

8. The apparatus of claim 7 and further including means responsive to said pair of sensing means for dynamically braking said drive means when said web loop is in said first zone.

9. In a web transport, means for selectively moving a web past an operating station, a reel adapted to hold said web, the path of said web between said reel and said operating station including a loop chamber adapted to accept a loop of said web at one end, a servo system for controlling the position of said loop in said chamber and including first sensing means in said chamber, a pair of mutually spaced sensing means bracketing said first sensing seans and defining a first zone in said chamber, at least a second zone extending from said first sensing means past one of said pair of sensing means toward the other end of said chamber, means responsive to said pair of sensing means to drive said reel in a direction adapted to return said loop to said first zone when it is outside the latter, and means responsive to said first sensing means throughout the travel of said loop in said second zone toward said other end of said chamber to apply a substantially unilateral braking force to said reel adapted to arrest said travel.

10. In a web transport, means for selectively moving a web past an operating station, a reel adapted to hold said web, the path of said web between said reel and said operating station including a loop chamber adapted to accept a loop of said web at one extreme, a servo system for controlling the position of said loop in said chamber and including a first pair of spaced sensing means bracketing a reference point in said chamber, a second pair of sensing means bracketing said first pair and defining a first zone in said chamber, a pair of overlapping zones each extending from one of said first pair past one of said second pair of sensing means on the other side of said reference point, means responsive to said second pair of sensing means to drive said reel in a direction adapted to return said loop to said first zone when it is outside the latter, and means responsive to said first pair of sensing means throughout the travel of said loop in said overlapping zones to apply a substantially unilateral braking force to said reel adapted to arrest said travel toward the extremes of said loop chamber.

11. In a vacuum-operated web transport, means including first and second counter-rotating capstans for selectively driving said web in opposite directions past an operating station, first and second rotatable web reels defining the extremes of the path of said web, first and second loop chambers of predetermined length each open at one end and adapted to have vacuum pressure applied at its opposite end, each of said chambers being positioned intermediate a capstan and its corresponding reel to receive a loop of said web through said open end, a reel motor coupled to each of said reels and adapted to drive the latter in a selected direction, a brake drum coupled to each of said reel motors, a pair of brake bands encircling each brake drum in opposite directions, each of said brake bands having a fixed and a movable end, a pair of actuators associated with each loop chamber, each of said actutors being connected to the movable end of a brake band and being normally adapted to maintain the latter out of contact with its corresponding brake drum, a first pair of sensing holes disposed in each of said loop chambers to bracket a crossover point therein, a second pair of sensing holes bracketing said first pair and defining a first zone in said loop chamber, a pair of overlapping zones each extending from one of said first pair past one of said second pair of sensing holes and bracketing said crossover point, the pressure at each of said sensing holes depending on the position of said web loop in said chamber, switch means responsive to the pressure prevailing at each sensing hole of said second pair when said web loop is outside said first zone to energize the corresponding reel motor for rotation in a direction adapted to move said web loop into said first zone, each of said actuators being responsive to the prevailing differential pressure at the limits of a separate one of said overlapping zones to move the connected brake band into contact with the associated brake drum when said web loop is in the latter zone, the action of said brake band being effective to apply a substantially unidirectional braking force to said brake drum.

12. The apparatus of claim 11 wherein said switch means are further effective to connect each of said reel motors for dynamic braking when the corresponding web loop is within said first zone.

13. A web transport comprising first and second counter-rotating capstans selectively adapted to drive said web in opposite directions, a pair of reels for receiving or dispensing said web through a path which includes a web loop between each reel and the corresponding capstan, a loop chamber corresponding to each reel, each loop chamber being open at one end to receive one of said web loops and being adapted to have vacuum pressure applied at the other end to maintain said web in tension, the instantaneous position of said web loop along the length of its chamber determining the distribution of atmospheric and vacuum pressure therein, a first pair of spaced pressure sensing holes in said chamber bracketing a crossover point, a second pair of pressure sensing holes bracketing said first pair and defining a first zone, a pair of overlapping zones each extending from a sensing hole of said first pair past a sensing hole of said second pair on the opposite side of said crossover point, a drive motor and brake drum corresponding to each of said web reels, a pair of brake bands encircling each of said brake drums in opposite directions, each brake band having fixed and movable ends and being adapted to apply a substantially unilateral braking force to its corresponding drum, a separate actuator coupled to each of said movable ends and normally maintaining the corresponding brake band out of contact with its associated drum, switch means connected to each of said reel motors and responsive to the prevailing pressure at respective sensing holes of said second pair to energize said reel motor to return said web loop to said first zone when it is outside the latter, each of said actuators being responsive to the differential pressure at the limits of a separate one of said overlapping zones to maintain the associated brake band in contact with its brake drum when said web loop is in the latter zone.

14. The apparatus claim 13 wherein said switch means are further effective to connect said reel motor for dynamic braking when said web loop is in said first zone.

15. A tape transport comprising an operating station, a pair of tape reels disposed on opposite sides of said operating station to dispense or take up tape, a loop chamber positioned between each tape reel and said operating station and open at one extreme to accept a loop of said tape, means for applying vacuum pressure at the other extreme of each of said loop chambers to maintain tension in said tape, the position of said tape loop in said chamber determining the distribution of atmospheric and vacuum pressure therein, means for selectively moving said tape past said operating station, a drive motor and a brake drum coupled to each of said tape reels, a pair of brake bands encircling each of said brake drums in opposite directions each fixed at one end, a non-linear servo system for controlling the position of each tape loop in its loop chamber, each of said servos including a first pair of mutually spaced sensing points bracketing a crossover point in said chamber, a second pair of sensing points bracketing said first pair and defining a first zone in said chamber, a pair of overlapping zones each extending from one of said first pair of sensing points substantially to the end of said chamber on the opposite side of said crossover point, a pressure-operated switch associated with each one of said second pair of sensing points, each of said switches being responsive to the sensed pressure for connecting the corresponding drive motor to an energization circuit when said tape loop is outside said first zone to rotate said motor in a direction adapted to return said loop to the latter zone, said switch being further adapted to connect said drive motor for dynamic braking when said tape loop is within said first zone, an actuator connected to the other end of each of said brake bands and normally adapted to maintain the latter out of contact with the associated brake drum, each of said actuators being coupled to said chamber to be responsive to the differential pressure at the limits of one of said overlapping zones to move the connected brake band into contact with its brake drum, said brake band applying a unilateral braking force to said brake drum acting in opposition to the tape loop travel in said last recited zone toward an extreme of said loop chamber.

References Cited by the Examiner

UNITED STATES PATENTS

| | | | |
|---|---|---|---|
| 2,921,753 | 1/1960 | Lahti et al. | 242—55.12 |
| 3,112,473 | 11/1963 | Wicklund et al. | 242—55.12 |
| 3,137,453 | 6/1964 | Wooldridge | 242—55.12 |

FRANK J. COHEN, *Primary Examiner.*

GEORGE F. MAUTZ, *Assistant Examiner.*